United States Patent
MacMillian et al.

(10) Patent No.: US 9,777,822 B2
(45) Date of Patent: Oct. 3, 2017

(54) GEAR UNIT

(71) Applicant: Schaeffler Technologies GmbH & Co. KG, Herzogenaurach (DE)

(72) Inventors: Loyal George MacMillian, Karlsruhe (DE); Georg Goeppert, Hausach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 286 days.

(21) Appl. No.: 14/413,622

(22) PCT Filed: Jul. 15, 2013

(86) PCT No.: PCT/US2013/200048
§ 371 (c)(1),
(2) Date: Jan. 8, 2015

(87) PCT Pub. No.: WO2014/015866
PCT Pub. Date: Jan. 30, 2014

(65) Prior Publication Data
US 2016/0208904 A1 Jul. 21, 2016

(30) Foreign Application Priority Data
Jul. 26, 2012 (DE) ........................ 10 2012 213 152

(51) Int. Cl.
*F16H 57/00* (2012.01)
*F16H 63/32* (2006.01)

(52) U.S. Cl.
CPC ......... *F16H 57/0006* (2013.01); *F16H 63/32* (2013.01)

(58) Field of Classification Search
CPC .. F16H 57/0006; F16H 59/0208; F16H 63/32; F16H 2061/0474; F16H 59/041; F16D 23/025; F16D 23/04
See application file for complete search history.

(56) References Cited

U.S. PATENT DOCUMENTS 2,633,954 A * 4/1953 Allen ...................... F16D 23/04
192/48.611
3,129,794 A * 4/1964 Altmann ................. F16D 23/04
192/105 C
(Continued)

FOREIGN PATENT DOCUMENTS

| CN | 101586642 A | 11/2009 |
|---|---|---|
| CN | 101713459 A | 5/2010 |

(Continued)

*Primary Examiner* — Stacey Fluhart
(74) *Attorney, Agent, or Firm* — Simpson & Simpson, PLLC

(57) ABSTRACT

A transmission comprising at least a first shaft and at least a second shaft parallel thereto, comprising a first gear wheel and a second gear wheel arranged on the first and second shafts, respectively, the first gear wheel of said first shaft and the second gear of the second shaft arranged as a gear wheel pair and meshing with each other, wherein the first gear wheel of the gear wheel pair is non-rotatably fixed to the first shaft and the second gear wheel of the gear wheel pair is rotatably arranged on the second shaft, an axially displaceable shifting collar for fixing the second gear wheel against rotation relative to the second shaft, an axially displaceable selector fork for actuating the shifting collar and, a damping element arranged on the selector fork and is able to engage a transmission element.

6 Claims, 2 Drawing Sheets

(56) References Cited

U.S. PATENT DOCUMENTS

| | | | | |
|---|---|---|---|---|
| 4,131,185 | A | * | 12/1978 | Schall ............... F16D 23/04 |
| | | | | 192/48.614 |
| 4,271,943 | A | * | 6/1981 | Kuzma ............. F16D 23/025 |
| | | | | 192/48.607 |
| 5,214,975 | A | * | 6/1993 | Zalewski ............ F16D 3/78 |
| | | | | 464/73 |
| 2012/0137805 | A1 | * | 6/2012 | Oh ..................... F16H 3/089 |
| | | | | 74/339 |
| 2015/0330462 | A1 | * | 11/2015 | Kirchhoffer ........ F16D 23/06 |
| | | | | 192/53.361 |

FOREIGN PATENT DOCUMENTS

| | | | |
|---|---|---|---|
| CN | 102062179 | A | 5/2011 |
| DE | 19712389 | A1 | 10/1997 |
| JP | 2008121729 | A | 5/2008 |

* cited by examiner

GEAR UNIT

CROSS-REFERENCE TO RELATED APPLICATIONS

The present application is the U.S. national stage application pursuant to 35 U.S.C. §371 of International Application No. PCT/DE2013/200048, filed Jul. 15, 2013, which application claims priority from German Patent Application No. DE 10 2012 213 152.3, filed Jul. 26, 2012, which applications are incorporated herein by reference in their entireties.

TECHNICAL FIELD

The disclosure relates to a transmission including at least one transmission input shaft and at least one second shaft parallel thereto and including gear wheels arranged thereon, and to a method of controlling the transmission.

BACKGROUND

Different embodiments of gear units or transmissions are known for motor vehicles. In various operating situations of the vehicle or transmission, torque fluctuations may cause noise or vibration.

The provision of permanent measures to suppress noise or vibration, however, causes the efficiency of the transmission to deteriorate, which is mainly seen rather as a disadvantage.

Furthermore, control strategies are known that have a negative effect on the immediate reaction of the transmission or the drivability. Furthermore, in high-efficiency transmissions, there are clacking or rattling noises that cannot be eliminated by control strategies alone.

Thus there exists a long felt need to provide a transmission that is improved in terms of rattling noises and torque fluctuation and provides a corresponding method.

SUMMARY

In terms of the transmission, an object of the present disclosure is to provide a transmission that is improved in terms of rattling noises and torque fluctuation. Another object of the disclosure is to provide a corresponding method.

According to aspects illustrated herein, there is provided a transmission comprising at least a first shaft and at least a second shaft parallel thereto, comprising a first gear wheel and a second gear wheel arranged on the first and second shafts, respectively, the first gear wheel of the first shaft and the second gear of the second shaft arranged as a gear wheel pair and meshing with each other, wherein the first gear wheel of the gear wheel pair is non-rotatably fixed to the first shaft and the second gear wheel of the gear wheel pair is rotatably arranged on the second shaft, an axially displaceable shifting collar for fixing said second gear wheel against rotation relative to the second shaft, an axially displaceable selector fork for actuating the shifting collar and, a damping element arranged on the selector fork and is able to engage a transmission element.

Additionally, according to aspects illustrated herein, there is provided a method of controlling a transmission, wherein in operating situations that require vibration reduction, the control unit initiates an actuation of a selector fork by means of an actuating unit to engage a damping element with a transmission element for vibration damping purposes.

In accordance with an advantageous feature, the damping element may be an extension is able to engage with a transmission element. An extension may easily be arranged or formed on the selector fork in a cost-efficient way.

Even further, according to aspects illustrated herein, there is provided a friction element may be provided on the extension in an engagement region that is provided for engagement. For protection against wear, a wear-resistant friction element is provided, which may be engaged with a rotatable element.

Even further, according to aspects illustrated herein, there is provided that the transmission element may be a gear wheel or a flank of a gear wheel. Thus an essentially stationary element, namely the extension, is engaged with a rotating transmission element, resulting in a damping effect.

Even further, according to aspects illustrated herein, there is provided that the gear wheel may be a gear wheel of the same shaft as the shaft that is associated with the selector fork and the associated shifting collar. In this context, the gear wheel may advantageously be a gear wheel that is adjacent to the selector fork because in this way, the distances that need to be covered are short.

Even further, according to aspects illustrated herein, there is provided that the gear wheel may be a gear wheel of a different shaft than the shaft that is associated with the selector fork and the associated shifting collar. This measure allows an adjacent gear wheel to be acted upon despite the change of shafts if the gear wheel is close enough in the axial direction.

Even further, according to aspects illustrated herein, there is provided a control unit and an actuating unit may be provided to actuate the selector fork in a controlled way to actuate a targeted engagement of the damping element with the element of the transmission for vibration damping purposes.

In terms of the method, the object is attained by a method for controlling a transmission, wherein in operating situations that require a vibration reduction, the control unit controls an actuation of a selector fork by means of an actuating unit to engage a damping element with an element of the transmission for vibration damping purposes.

In this context, it is expedient for the control unit to select and actuate the selector fork and the transmission element as a function of the operating point or of the gear that is engaged in the transmission.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
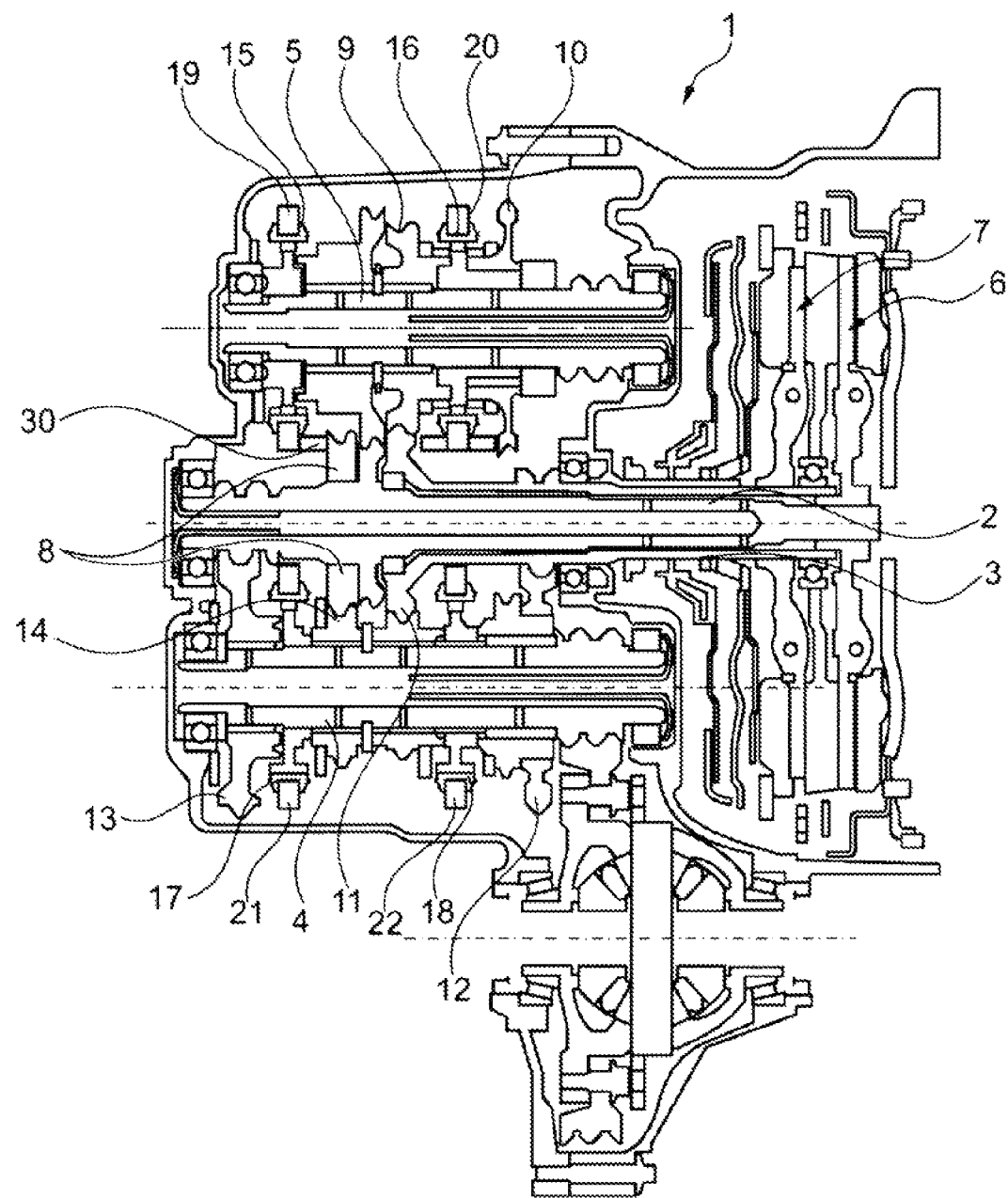
FIG. 1 is a diagrammatic representation of a transmission.

FIG. 1 illustrates transmission 1 with first shaft 2 provided as first input shaft 2 and second input shaft 3. The first and second input shafts 2, 3 are arranged to be coaxial with each other. Furthermore, second shaft 4 is parallel thereto and further shaft 5 is parallel thereto are provided.

Transmission 1 is thus embodied as a double clutch transmission including two transmission input shafts 2, 3 and two shafts 4, 5 arranged to be parallel to the two transmission input shafts. By means of respective clutch 6, 7, transmission input shafts 2, 3 are connectable to a driving shaft such as an output shaft of a combustion engine.

Respective gear wheels 8 to 14 are provided on shafts 2, 3, 4, 5 of transmission 1. Gear wheels 11 to 14 are arranged in pairs in such a way that one gear wheel of a gear wheel pair is connected to first shaft 2, 3 and a second gear wheel of a gear wheel pair is connected to second shaft 4, 5, i.e. arranged thereon for relative rotation.

One of the gear wheels of a gear wheel pair is connected to a shaft so as to be fixed against rotation relative thereto whereas the other gear wheel of the gear wheel pair is received for relative rotation on the shaft that it is arranged on. Furthermore, to secure the gear wheel capable of relative rotation against rotation relative to the shaft that it is arranged on, axially displaceable shifting collars 15, 16, 17, 18 are provided. Shifting collars 15, 16, 17, 18 are provided to be axially displaceable to fix the gear wheel that is arranged for relative rotation against rotation relative to the shaft. Each shifting collar is actuated, i.e. axially displaced, by selector forks 19, 20, 21, 22. The selector fork is actuated, in particular displaced, by an actuating system, which is not shown in the exemplary embodiment of FIG. 1.

Damper elements 30 that are able to engage with a transmission element are arranged on selector fork.

Figure 2:
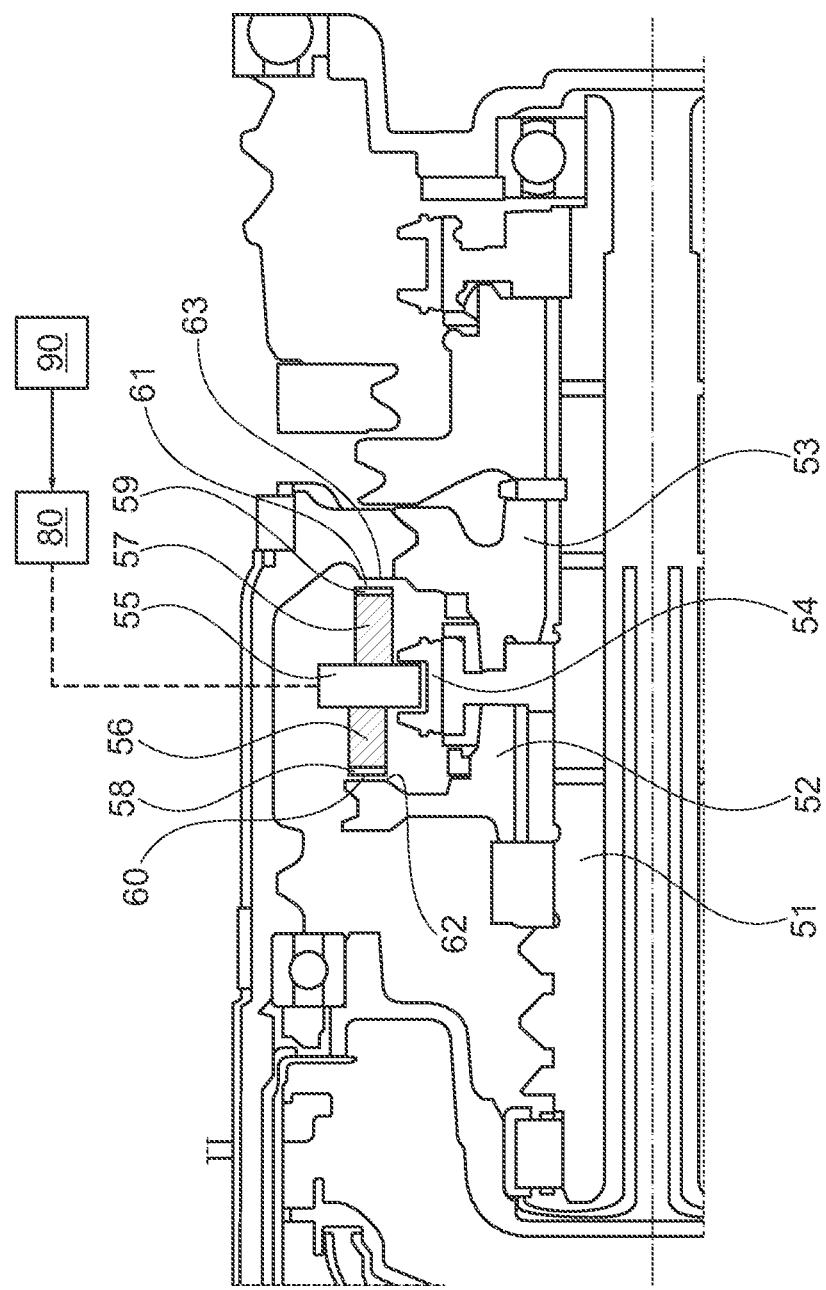
FIG. 2 is a view of a detail of a transmission.

FIG. 2 illustrates a detail of transmission 50 including shaft 51, gear wheel 52, and second gear wheel 53. The gear wheels are connected to shaft 51 so as to be rotatable relative thereto. Shifting collar 54 is axially displaceable towards first gear wheel 52 or second gear wheel 53 to fix respective gear wheel 52, 53 against rotation relative to shaft 51. Selector fork 55 is used to actuate shifting collar 54. Damping elements 56, 57 that are able to engage with a transmission element are connected to selector fork 55.

Damping element 56, 57 is preferably embodied as an extension protruding from selector fork 55 in the axial direction.

In their engagement regions 58, 59, damping element 56 embodied as an extension and damping element 57 embodied as an extension have respective friction element 60, 61, which is brought into engagement with the transmission element.

The transmission element that is acted upon by damping element 56, 57, is flank 62 of a gear wheel or wall 63 of the housing of the transmission, for example.

As it is apparent from FIG. 2, damping element 56 of shifting collar 55 acts upon adjacent gear wheel 62. In the exemplary embodiment shown in FIG. 1, damping element 30 is provided to act upon gear wheel 14. The damping element is associated with shaft 5, whereas gear wheel 14 is associated with shaft 2.

Thus it is expedient for the gear wheel that is acted upon by the damping element to be a gear wheel of the same shaft as the shaft that is associated with the selector fork and the associated shifting collar to which the damping element belongs.

Alternatively, the gear wheel may be a gear wheel associated with a different shaft than the selector fork and the associated damping element.

Actuating unit 80 controlled by control unit 90 and provided to control selector fork 55 and potentially other selector forks is diagrammatically shown in FIG. 2. Thus control unit 90 controls a deliberate engagement of damping element 56, 57 with transmission element 62, 63 to achieve vibration reduction.

An engagement of the damping element with the transmission element only occurs in specific operating situations. During a regular shifting cycle, there will be no contact or engagement between the transmission element and the damping element. This means that the damping element is dimensioned such that in a regular shifting cycle, with the shifting collar and selector fork actuated in the axial direction, the damping element will not be in engagement with the transmission element. That is to say that between the transmission element and the damping element, there is sufficient clearance that no additional damping occurs in a regular shifting cycle.

Nevertheless, in specific operating situations, the selector fork may over-actuate the shifting collar. Only in such an over-actuated operating condition is the damping element moved towards the transmission element to act thereon, thus attaining a damping effect.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 1 transmission
2 first shaft
3 second input shaft
4 second shaft
5 parallel shaft
6 clutch
7 clutch
8 gear wheel
9 gear wheel
10 gear wheel
11 gear wheel
12 gear wheel
13 gear wheel
14 gear wheel
15 shifting collar
16 shifting collar
17 shifting collar
18 shifting collar
19 selector fork
20 selector fork
21 selector fork
22 selector fork 30 damping element
50 transmission
51 shaft
52 gear wheel
53 gear wheel
54 shifting collar
55 selector fork
56 damping element
57 damping element
58 engagement region
59 engagement region
60 friction element
61 friction element
62 flank as a transmission element
63 wall as a transmission element
80 actuating unit
90 control unit

What is claimed is:

1. A transmission comprising at least a first shaft and at least a second shaft parallel thereto, comprising:
   a first gear wheel and a second gear wheel arranged on said first and second shafts, respectively, said first gear wheel of said first shaft and said second gear of said second shaft arranged as a gear wheel pair and meshing with each other, wherein said first gear wheel of said gear wheel pair is non-rotatably fixed to said first shaft and said second gear wheel of said gear wheel pair is rotatably arranged on said second shaft;
   an axially displaceable shifting collar for fixing said second gear wheel against rotation relative to said second shaft;
   an axially displaceable selector fork for actuating said shifting collar; and,
   a damping element arranged on said selector fork and operatively arranged to engage said first gear wheel or a flank of said first gear wheel.

2. The transmission recited in claim 1, wherein said damping element is an extension that is operatively arranged to engage said first gear wheel or said flank of said first gear wheel.

3. The transmission recited in claim 2, wherein a friction element is arranged on said damping element for engagement of said extension with said first gear wheel or said flank of said first gear wheel.

4. The transmission recited in claim 1, further comprising a control unit and an actuating unit operatively arranged to actuate said selector fork to engage said damping element with said first gear wheel or said flank of said first gear wheel for vibration damping purposes.

5. A method of controlling a transmission in operating situations that require vibration reduction, the transmission comprising a first gear wheel and a second gear wheel arranged on said first and second shafts, respectively, said first gear wheel of said first shaft and said second gear of said second shaft arranged as a meshing gear wheel pair, wherein said first gear wheel of said gear wheel pair is non-rotatably fixed to said first shaft and said second gear wheel of said gear wheel pair is rotatably arranged on said second shaft, an axially displaceable shifting collar for fixing said second gear wheel against rotation relative to said second shaft, an axially displaceable selector fork for actuating said shifting collar and, a damping element arranged on said selector fork and operatively arranged to engage a transmission element, the method comprising:
   initiating an actuation of a selector fork by means of an actuating unit via a control unit to engage a damping element with said first gear wheel or a flank of said first gear wheel for vibration damping purposes.

6. The method recited in claim 5, wherein said control unit selects and actuates said selector fork to engage said damping element with said transmission element.

* * * * *